(12) United States Patent
Kaida et al.

(10) Patent No.: US 8,229,241 B2
(45) Date of Patent: Jul. 24, 2012

(54) SYSTEM AND METHOD FOR IMMERSION ENHANCEMENT BASED ON ADAPTIVE IMMERSION ENHANCEMENT PREDICTION

(75) Inventors: Xiao Kaida, Yongin-si (KR); Ji Young Hong, Daejeon (KR); Du-Sik Park, Suwon-si (KR); Ho Young Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1035 days.

(21) Appl. No.: 12/178,103

(22) Filed: Jul. 23, 2008

(65) Prior Publication Data
US 2009/0196521 A1  Aug. 6, 2009

(30) Foreign Application Priority Data
Jan. 31, 2008  (KR) .................. 10-2008-0010349

(51) Int. Cl.
*G06K 9/40* (2006.01)
(52) U.S. Cl. ........ 382/254; 382/173; 382/274; 348/578; 348/586
(58) Field of Classification Search ................. None
See application file for complete search history.

(56) References Cited

U.S. PATENT DOCUMENTS

| | | | | |
|---|---|---|---|---|
| 7,990,429 B2 * | 8/2011 | Saito | ............ | 348/222.1 |
| 2003/0152285 A1 * | 8/2003 | Feldmann et al. | ............ | 382/274 |
| 2004/0042680 A1 * | 3/2004 | Saund | ............ | 382/274 |
| 2005/0281474 A1 * | 12/2005 | Huang | ............ | 382/239 |
| 2007/0262985 A1 * | 11/2007 | Watanabe et al. | ............ | 345/420 |
| 2008/0002910 A1 * | 1/2008 | Ojima et al. | ............ | 382/277 |

FOREIGN PATENT DOCUMENTS

| | | |
|---|---|---|
| JP | 2005-10900 | 1/2005 |
| JP | 2005-190134 | 7/2005 |
| KR | 2002-41387 | 6/2002 |
| KR | 2007-2912 | 1/2007 |

* cited by examiner

*Primary Examiner* — Sath V. Perungavoor
*Assistant Examiner* — Jason Heidemann
(74) *Attorney, Agent, or Firm* — Staas & Halsey LLP

(57) ABSTRACT

A system and method of enhancing an immersion based on adaptive immersion enhancement prediction is provided. A system for enhancing an immersion includes a foreground/background separation unit to separate an input image into a foreground image and a background image using color information and frequency information of the input image, an immersion enhancement factor calculation unit to calculate an immersion enhancement factor of the input image using the foreground image and the background image, an immersion enhancement prediction unit to predict an immersion enhancement degree of the input image using the immersion enhancement factor, and an immersion enhancement processing unit to process immersion enhancement of the input image by determining whether the immersion enhancement is necessary based on the predicted immersion enhancement degree.

20 Claims, 6 Drawing Sheets

FIG. 5

| TEST IMAGE | INPUT | THRESHOLD | IMI | IEI | PERCENTAGE |
|---|---|---|---|---|---|
| CD | 32.96 | 90.00 | 9.16 | 15.84 | 173.06% |
| IDE | 1.90 | 5.00 | 5.70 | 9.30 | 163.16% |
| IDC | 1.50 | 1.00 | 6.67 | | |
| SIZE | 30.00 | 90.00 | 8.33 | 33.33 | |
| FAR | 36.83 | 30.00 | 20.36 | 40.73 | |
| SUM | | | 50.22 | 18.62 | 37.08% |

SYSTEM AND METHOD FOR IMMERSION ENHANCEMENT BASED ON ADAPTIVE IMMERSION ENHANCEMENT PREDICTION

CROSS-REFERENCE TO RELATED APPLICATION

This application claims the benefit of Korean Patent Application No. 2008-10349, filed on Jan. 31, 2008 in the Korean Intellectual Property Office, the disclosure of which is incorporated herein by reference.

BACKGROUND OF THE INVENTION

1. Field of the Invention

Aspects of the present invention relate to a system and method of enhancing an immersion based on adaptive immersion enhancement prediction, and more particularly, to a system and method of enhancing an immersion of an input image by adaptively predicting an immersion enhancement degree based on the input image, and processing an immersion enhancement factor.

2. Description of the Related Art

An immersion is one of complex human sensations including realism, involvement, a sense of actually being there, and the like. An immersion of an image is an important factor of measuring quality of the image. The immersion is affected by various factors.

Since the immersion is one of the human sensations, the immersion cannot be automatically predicted, and an immersion degree varies depending on images. Since the immersion varies depending on the image, a method of enhancing the immersion of the image must be limitedly applied depending on the images.

Accordingly, since the immersion cannot be generated by a uniform method for all images, a method of enhancing the immersion should be based on characteristics of the images. Since the characteristics of the images are not considered in a conventional art, effective enhancement of the immersion of the images is not realized.

Therefore, a method of adaptively enhancing the immersion depending on the characteristics of the images is needed.

SUMMARY OF THE INVENTION

According to an aspect of the present invention, a system for enhancing an immersion includes a foreground/background separation unit to separate an input image into a foreground image and a background image using color information and frequency information of the input image, an immersion enhancement factor calculation unit to calculate an immersion enhancement factor of the input image using the foreground image and the background image, an immersion enhancement prediction unit to predict an immersion enhancement degree of the input image using the immersion enhancement factor, and an immersion enhancement processing unit to process immersion enhancement of the input image by determining whether the immersion enhancement is necessary based on the predicted immersion enhancement degree.

In an aspect of the present invention, the immersion enhancement factor calculation unit includes a viewing angle calculation unit to calculate a viewing angle using a total size of the input image, a foreground ratio calculation unit to calculate a foreground ratio to the entire input image, a color information difference calculation unit to calculate a color information difference between the foreground image and the background image of the input image, and an image information difference calculation unit to calculate an image information difference between the foreground image and the background image of the input image.

In an aspect of the present invention, the image information difference calculation unit includes an energy difference calculation unit to calculate an energy difference between the foreground image and the background image of the input image, and a color distribution difference calculation unit to calculate a color distribution difference between the foreground image and the background image of the input image.

According to another aspect of the present invention, a method of enhancing an immersion includes separating an input image into a foreground image and a background image using color information and frequency information of the input image, calculating an immersion enhancement factor of the input image using the separated foreground image and the separated background image, predicting an immersion enhancement degree of the input image using the immersion enhancement factor, and processing immersion enhancement of the input image by determining whether the immersion enhancement is necessary based on the predicted immersion enhancement degree.

Aspects of the present invention provide a system and method of enhancing an immersion that can adaptively predict an immersion enhancement degree using an immersion enhancement factor of an input image.

Aspects of the present invention also provide a system and method of enhancing an immersion that can predict an immersion enhancement degree based on a foreground image and a background image of an input image, thereby applying a characteristic of the input image and enhancing the immersion.

Aspects of the present invention also provide a system and method of enhancing an immersion that can determine an image processing factor based on an immersion enhancement degree, thereby effectively enhancing an immersion of an input image.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 illustrates an example of predicting an immersion enhancement degree of an input image according to an embodiment of the present invention.

DETAILED DESCRIPTION OF EMBODIMENTS

Figure 1:
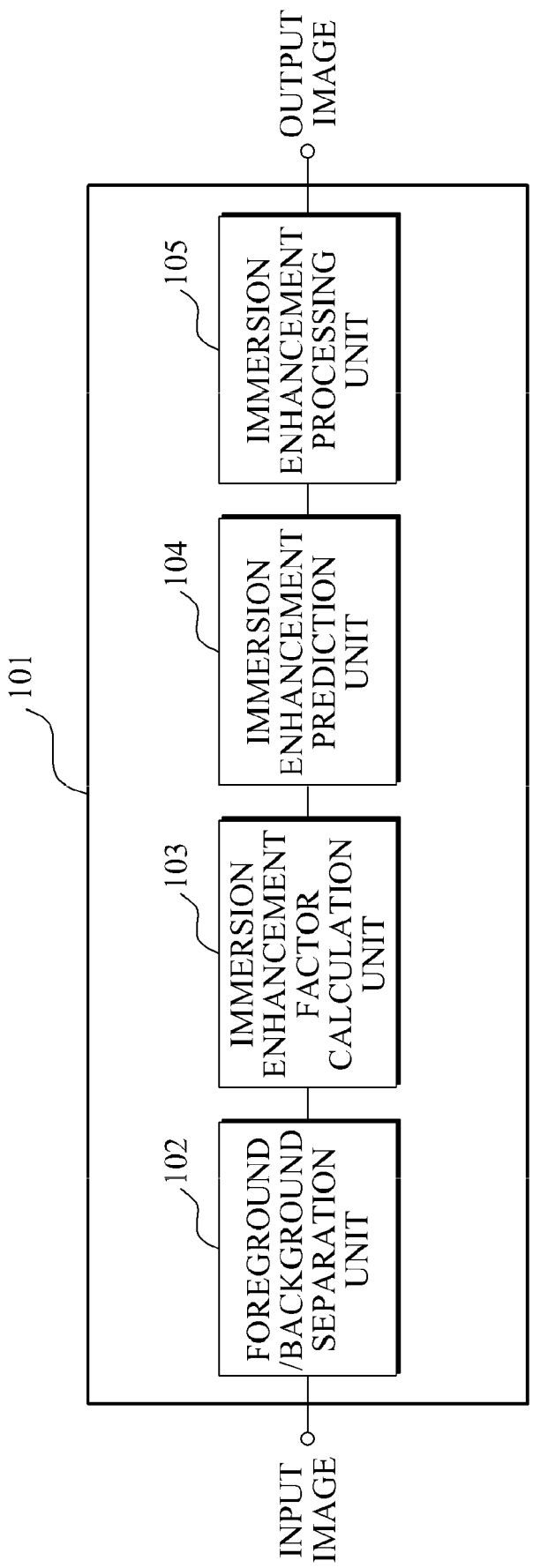
FIG. 1 is a block diagram illustrating a system for enhancing an immersion according to an embodiment of the present invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

A method of enhancing an immersion according to an embodiment of the present invention may be performed by a system for enhancing an immersion.

FIG. 1 is a block diagram illustrating a system 101 for enhancing an immersion according to an embodiment of the present invention.

Referring to FIG. 1, the system 101 for enhancing the immersion according to aspects of the present invention includes a foreground/background separation unit 102, an immersion enhancement factor calculation unit 103, an immersion enhancement prediction unit 104, and an immersion enhancement processing unit 105.

The foreground/background separation unit 102 may separate an input image into a foreground image and a background image. In the present invention, a method of separating the input image into the foreground image and the background image is not restricted and various methods may be applied.

For example, the foreground/background separation unit 102 may separate the input image into the foreground image and the background image in a color space showing a characteristic similar to a human sensation. Specifically, since the immersion of the image is highly related to the human sensation, the input image needs to be processed in the color space related to a human visual system.

For example, an input image of a Red Green Blue (RGB) color space may be converted into the color space related to the human visual system such as a brightness, a saturation, and a hue. For example, the color space related to the human visual system includes CIECAM02, CIELAB, or HSV. 'CIECAM02' is mainly used for accurate color prediction, and 'CIELAB' is mainly used for evaluating a difference of at least one of a color and an image. Also, 'HSV' is mainly used for a color design and simple industrial applications.

As illustrated in Table 1, different names and different abbreviations of the three human perceptual attributes may be applied to each color space.

TABLE 1

| Color space | Lightness or Brightness | Saturation or Chroma | Hue |
| --- | --- | --- | --- |
| CIECAM02 | Lightness (J) | Chroma (C) | Hue (H) |
| LCH | Lightness (L) | Chroma (C) | Hue (H) |
| HSV | Brightness (B or V) | Saturation (S) | Hue (H) |

The foreground/background separation unit 102 may separate the input image into the foreground image and the background image using color information and frequency information of the input image converted into the color space. Specifically, the foreground/background separation unit 102 may determine the color information and the frequency information of the entire input image. The foreground/background separation unit 102 may divide the input image based on a color area using hue information and saturation information being the color information. The foreground/background separation unit 102 may calculate a ratio of a pixel with respect to each color area. Smoothness of each color space may be scanned based on the ratio of the pixel.

The foreground/background separation unit 102 may establish the input image into the foreground image and the background image using the scanned smoothness. An area in which the smoothness is greater than a predetermined value may be established as the background image, and an area in which the smoothness is less than or equal to the predetermined value may be established as the foreground image.

The foreground/background separation unit 102 may separate the input image into the foreground image and the background image by precisely scanning a boundary area based on the frequency information. The foreground image may include a pixel denoting a high frequency, and the background image may include a pixel denoting a low frequency.

The above-described method is an example, and the foreground/background separation unit 102 may separate the input image into the foreground image and the background image using various methods.

The immersion enhancement factor calculation unit 103 may calculate an immersion enhancement factor of the input image using the foreground image and the background image. The system 101 for enhancing the immersion according to aspects of the present invention may adaptively enhance the immersion of the input image by predicting an immersion enhancement degree using a viewing angle of the input image, a foreground ratio to the input image, a color information difference between the foreground image and the background image, and an image information difference between the foreground image and the background image as the immersion enhancement factor.

The immersion enhancement prediction unit 104 may predict an immersion enhancement degree of the input image using the immersion enhancement factor. The immersion enhancement prediction unit 104 may predict the immersion enhancement degree by calculating an influence which the immersion enhancement factor exerts on immersion enhancement.

The immersion enhancement prediction unit 104 predicts the immersion enhancement degree of the input image using an Image Immersion Index (IMI) and an Immersion Enhancement Index (IEI) of each calculated immersion enhancement factor. Specifically, the immersion enhancement prediction unit 104 may determine the IMI of the input image using the IMI of each immersion enhancement factor.

The immersion enhancement prediction unit 104 may determine the IEI of the input image using the IEI of each immersion enhancement factor. Accordingly, the immersion enhancement prediction unit 104 may predict the immersion enhancement degree using the IMI of the input image and the IEI of the input image. A process of predicting the immersion enhancement degree is described in detail with reference to FIG. 2.

The immersion enhancement processing unit 105 may process immersion enhancement of the input image by determining whether the immersion enhancement is necessary based on the predicted immersion enhancement degree. The immersion enhancement processing unit 105 processes the immersion enhancement for the input image in which the predicted immersion enhancement degree is greater than a predetermined threshold of the immersion enhancement degree. A process during which the immersion enhancement processing unit 105 processes the immersion enhancement for the input image is described in detail with reference to FIG. 3 and FIG. 4.

Figure 2:
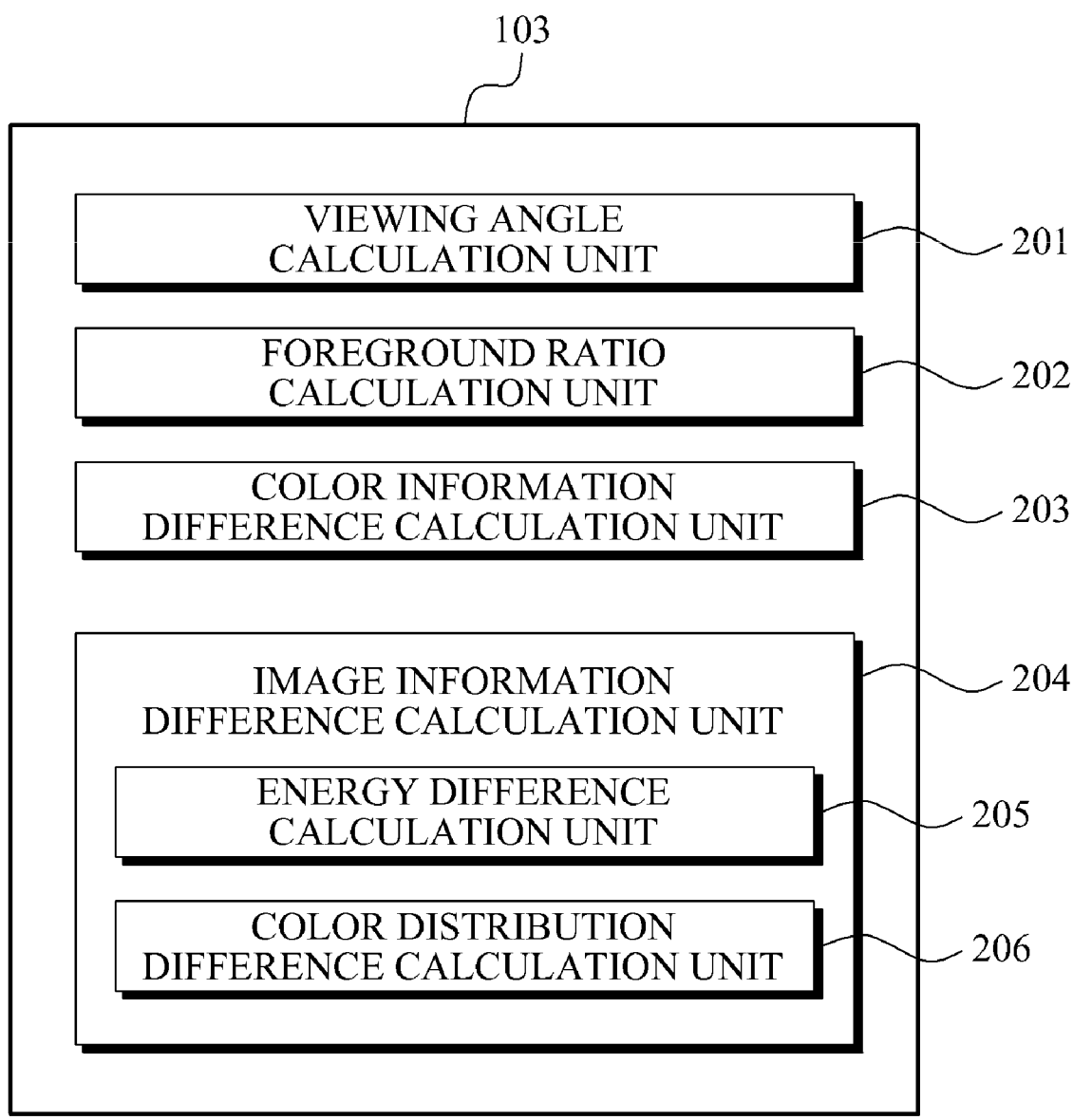
FIG. 2 is a block diagram illustrating an immersion enhancement factor calculation unit of FIG. 1.

FIG. 2 is a block diagram illustrating the immersion enhancement factor calculation unit 103 of FIG. 1.

Referring to FIG. 2, the immersion enhancement factor calculation unit 103 includes a viewing angle calculation unit 201, a foreground ratio calculation unit 202, a color information difference calculation unit 203, and an image information difference calculation unit 204.

The viewing angle calculation unit 201 may calculate a viewing angle using a total size of the input image. The total size of the input image may correspond to a size of a display expressing the input image. The total size of the input image may correspond to a resolution of the input image. Table 2 illustrates the viewing angle based on a size of a standard display.

TABLE 2

| Standard display | Viewing angle |
|---|---|
| Conventional television (TV) | 10° |
| High-Definition TV (HDTV) | 30° |
| Movie screen | 38° |
| Ultra-Definition TV (UDTV) | 60° |

For example, the viewing angle calculation unit 201 may calculate the viewing angle using a size of the input image in accordance with Equation 1:

Viewing angle=tan$^{-1}$(size of an input image/viewing distance) [Equation 1]

Referring to the above-described Equation 1, the viewing angle is proportional to the total size of the input image, and is in inverse proportion to the viewing distance. Generally, as the viewing angle increases, the immersion shows a high value.

The foreground ratio calculation unit 202 may calculate a foreground ratio to the entire input image. The foreground ratio denotes a ratio of a foreground image to the entire input image. The foreground ratio calculation unit 202 may calculate the foreground ratio to the entire input image using a number of pixels included in the foreground image.

For example, the foreground ratio calculation unit 202 may calculate the foreground ratio using Equation 2:

$$A = 2\tan^{-1}\left(\frac{i_F}{i}\right),\quad \text{[Equation 2]}$$

where A denotes a foreground ratio. $i_F$ denotes a number of pixels included in the foreground image, and i denotes a number of pixels included in the entire input image. As the foreground ratio increases, the immersion increases.

The color information difference calculation unit 203 may calculate a color information difference between the foreground image and the background image of the input image. The color information difference calculation unit 203 calculates a difference of a brightness, a saturation, and a hue between the foreground image and the background image of the input image. Each color information difference denotes a difference of an average value of the brightness, the saturation, and the hue with respect to each of the foreground image and the background image.

The image information difference calculation unit 204 may calculate an image information difference between the foreground image and the background image of the input image. Referring to FIG. 2, the image information difference calculation unit 204 includes an energy difference calculation unit 205 and a color distribution difference calculation unit 206.

The energy difference calculation unit 205 may calculate an energy difference between the foreground image and the background image of the input image. The energy difference calculation unit 205 calculates an image gradient ratio between the foreground image and the background image of the input image using brightness information. For example, the energy difference calculation unit 205 may calculate the energy difference by applying a Sobel gradient mask to each of the foreground image and the background image.

For example, the energy difference calculation unit 205 may calculate the energy difference using Equation 3:

$$\overline{IF_{grad}} = \sum_{x}^{F}\sum_{y}^{F}(|G_x|+|G_y|)/Pixel_F,\quad\text{[Equation 3]}$$

$$\overline{IB_{grad}} = \sum_{x}^{B}\sum_{y}^{B}(|G_x|+|G_y|)/Pixel_B$$

$$\text{Energy\_Ratio} = \frac{\overline{IF_{grad}}}{\overline{IB_{grad}}},$$

where $\overline{IF_{grad}}$ and $\overline{IB_{grad}}$ respectively denote an image gradient of a foreground image and a background image. Also, $Pixel_F$ and $Pixel_B$ denote pixel brightness values before applying the Sobel gradient mask, and $G_x$ and $G_y$ respectively denote pixel brightness values by applying the Sobel gradient mask in a horizontal direction and the Sobel gradient mask in a vertical direction.

A method of calculating the energy difference using the Sobel gradient mask is an example. The energy difference calculation unit 205 may calculate the energy difference between the foreground image and the background image of the input image by applying various methods without being limited to a specific method. Also, as the energy difference increases, the immersion increases.

The color distribution difference calculation unit 206 may calculate a color distribution difference between the foreground image and the background image of the input image using saturation information and hue information. For example, the color distribution difference calculation unit 206 may calculate a sum of color areas with respect to each of the foreground image and the background image of the input image using the saturation information and the hue information. The color distribution difference calculation unit 206 may calculate the color distribution difference using the calculated ratio of the sum of color areas of each of the foreground image and the background image of the input image.

Table 3 and Table 4 are examples to describe a process of calculating the color distribution difference respectively using the color area of the foreground image and the color area of the background image.

TABLE 3

| Hue (0-20) | 0.3% | Hue (120-140) | 10.3% | Hue (240-260) | 0.8% |
|---|---|---|---|---|---|
| Hue (20-40) | 1.0% | Hue (140-160) | 0.3% | Hue (260-280) | 0.1% |
| Hue (40-60) | 5.3% | Hue (160-180) | 0.1% | Hue (280-300) | 0.0% |
| Hue (60-80) | 35.6% | Hue (180-200) | 0.2% | Hue (300-320) | 0.0% |
| Hue (80-100) | 10.0% | Hue (200-220) | 0.3% | Hue (320-340) | 0.0% |
| Hue (100-120) | 11.4% | Hue (220-240) | 1.1% | Hue (340-360) | 0.1% |
| Grey (C < 10) | 23.2% | Sum | 6 | | |

TABLE 4

| Hue (0-20) | 0.0% | Hue (120-140) | 0.2% | Hue (240-260) | 7.4% |
|---|---|---|---|---|---|
| Hue (20-40) | 0.0% | Hue (140-160) | 0.3% | Hue (260-280) | 0.1% |
| Hue (40-60) | 0.0% | Hue (160-180) | 0.5% | Hue (280-300) | 0.0% |
| Hue (60-80) | 0.4% | Hue (180-200) | 0.9% | Hue (300-320) | 0.0% |
| Hue (80-100) | 0.6% | Hue (200-220) | 7.0% | Hue (320-340) | 0.0% |
| Hue (100-120) | 0.6% | Hue (220-240) | 72.7% | Hue (340-360) | 0.0% |
| Grey (C < 10) | 0.1% | Sum | 4 | Ratio | 1.5 |

Table 3 shows the hue information and the saturation information to calculate the color area of the foreground image. Table 4 shows the hue information and the saturation information to calculate the color area of the background image. Table 3 and Table 4 show ratios of pixels corresponding to each of 18 hue areas established by dividing an entire area of a hue ranging from 0° to 360° by an interval of 20° with respect to each of the foreground image and the background image. When a saturation is less than 10 (C<10), a corresponding area is set as a grey color.

For example, the color distribution difference calculation unit 206 may determine a sum of an area where a ratio of pixels corresponding to each hue area is greater than 5%, as the color area of each of the foreground image and the background image. In Table 3, a sum of color areas with respect to the foreground image is 6. In Table 4, a sum of color areas with respect to the background image is 4. The color distribution difference may be calculated as a ratio of the sum of color areas with respect to the foreground image to the sum of color areas with respect to the background image. Accordingly, the color distribution difference may be calculated as 6/4=1.5. Thus, as the color distribution difference increases, the immersion decreases.

The immersion enhancement prediction unit 104 may determine an IMI of the input image using the IMI of each immersion enhancement factor. For example, the immersion enhancement prediction unit 104 may determine the IMI of each of the viewing angle, the foreground ratio, the color information difference, and the image information difference being the immersion enhancement factors.

For example, the immersion enhancement prediction unit 104 may determine the IMI with respect to the viewing angle, $S_{IMI}$, using Equation 4:

$$S_{IMI} = \alpha \frac{S_I}{S_T}, \quad \text{[Equation 4]}$$

where $S_I$ denotes a viewing angle determined by the above-described Equation 1, and $S_T$ denotes a predetermined threshold of the viewing angle. $S_T$ may be set as 90°. $\alpha$ denotes a constant, and is changed depending on a configuration of a system.

For example, the immersion enhancement prediction unit 104 may determine the IMI with respect to the foreground ratio, $FAR_{IMI}$, using Equation 5:

$$\begin{cases} FAR_{IMI} = \alpha \frac{FAR_I}{FAR_T}, & FAR_I \leq FAR_T \\ FAR_{IMI} = \alpha \frac{FAR_T}{FAR_I}, & FAR_I > FAR_T \end{cases} \quad \text{[Equation 5]}$$

where $FAR_I$ denotes a foreground ratio of an input image determined by the above-described Equation 2, and $FAR_T$ denotes a predetermined threshold of the foreground ratio. $\alpha$ denotes a constant, and is changed depending on a configuration of a system.

For example, the immersion enhancement prediction unit 104 may determine the IMI with respect to the color information difference, $CD_{IMI}$, using Equation 6:

$$CD_{IMI} = \alpha \frac{CD_I}{CD_T}, \quad \text{[Equation 6]}$$

where $CD_I$ denotes a color information difference of an input image, and $CD_T$ denotes a predetermined threshold of the color information difference. $\alpha$ denotes a constant, and is changed depending on a configuration of a system.

For example, the immersion enhancement prediction unit 104 may determine the IMI with respect to the image information difference, $ID_{IMI}$, using Equation 7. The IMI with respect to the image information difference may be calculated using the energy difference and the color distribution difference between the foreground image and the background image of the input image.

$$ID_{IMI} = \delta \frac{IDE_I}{IDE_T} + \varepsilon \frac{IDC_T}{IDC_I}, \quad \text{[Equation 7]}$$

where $IDE_I$ denotes an energy difference of an input image, and $IDE_T$ denotes a predetermined threshold of the energy difference. $IDC_T$ denotes a color distribution difference of the input image, and $IDC_T$ denotes a predetermined threshold of the color distribution difference. $\delta$ and $\varepsilon$ respectively denote a constant, and are changed depending on a configuration of a system.

For example, the immersion enhancement prediction unit 104 may determine the IMI of the input image using Equation 8:

$$IMI = S_{IMI} + FAR_{IMI} + CD_{IMI} + ID_{IMI}, \quad \text{[Equation 8]}$$

where IMI denotes an entire IMI. $S_{IMI}$, $FAR_{IMI}$, $CD_{IMI}$, and $ID_{IMI}$ denote an IMI of each immersion enhancement factor determined by the above-described Equations 4 through 7.

The immersion enhancement prediction unit 104 may determine an IEI of the input image using the IEI of each immersion enhancement factor. The IEI of the input image may be used for effectively processing the immersion enhancement with respect to the input image.

For example, the immersion enhancement prediction unit 104 may determine the IEI of each immersion enhancement factor using Equation 9:

[Equation 9]

$$S_{IEI} = \frac{S_T - S_I}{S_T} \times \alpha \quad (1)$$

$$\begin{cases} FAR_{IEI} = \frac{FAR_I}{FAR_T} \times \alpha, & FAR_I \leq FAR_T \\ FAR_{IEI} = \frac{FAR_T}{FAR_I} \times \alpha, & FAR_I > FAR_T \end{cases} \quad (2)$$

$$CD_{IEI} = \frac{CD_T - CD_I}{CD_T} \times \alpha \quad (3)$$

$$ID_{IEI} = \frac{IDE_T - IDE_I}{IDE_T} \times \alpha, \quad (4)$$

where $S_{IEI}$, $FAR_{IEI}$, $CD_{IEI}$, and $ID_{IEI}$ respectively denote an IEI of each of a viewing angle, a foreground ratio, a color information difference, and an image information difference of an image. $\alpha$ denotes a constant, and is changed depending on a configuration of a system. Other variables are described in the above-described Equations 4 through 7.

For example, the immersion enhancement prediction unit 104 may determine the IEI of the input image using Equation 10:

$$IEI = (CD_{IEI} + ID_{IEI}) \times (FAR_{IEI} + S_{IEI}).$$ [Equation 10]

For example, the immersion enhancement prediction unit 104 may determine the immersion enhancement degree of the input image, IEI_P, using Equation 11:

$$IEI\_P = \frac{IEI}{IMI} \times 100\%,$$ [Equation 11]

where IEI_P denotes an immersion enhancement degree. Accordingly, the immersion enhancement prediction unit 104 predicts the immersion enhancement degree using the IMI of the input image and the IEI of the input image. The system for enhancing the immersion according to aspects of the present invention processes the immersion enhancement for the input image in which the immersion enhancement degree is greater than a predetermined threshold of the immersion enhancement degree.

Figure 3:
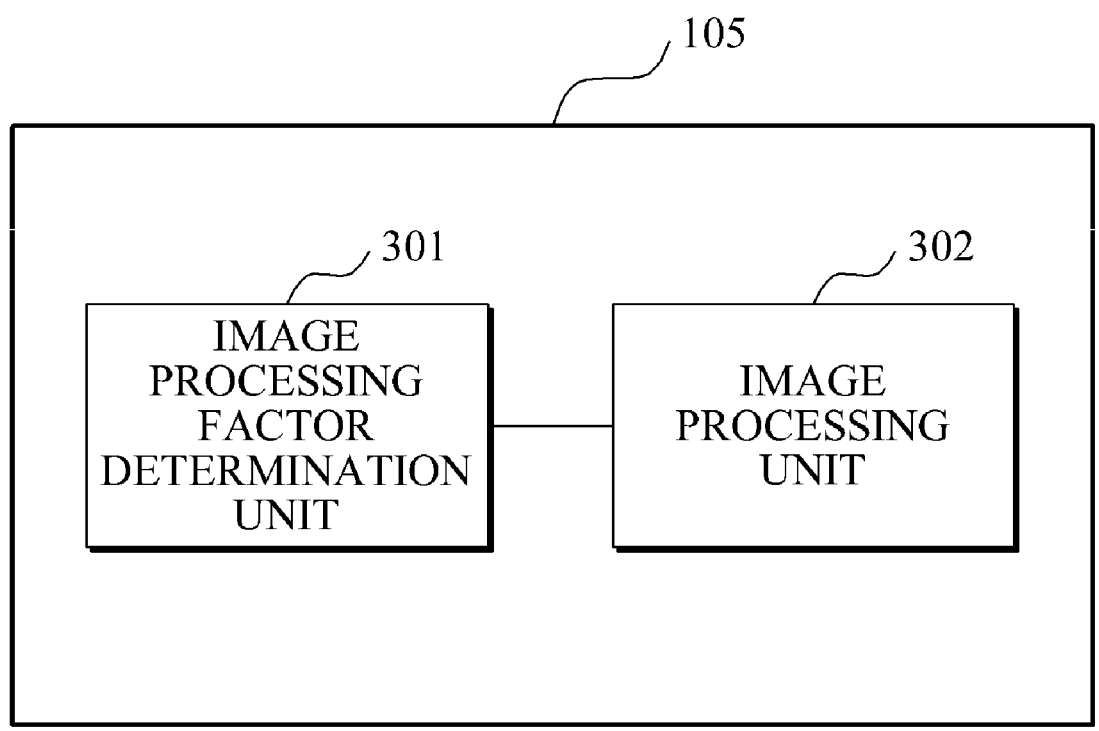
FIG. 3 is a block diagram illustrating an immersion enhancement processing unit of FIG. 1.

FIG. 3 is a block diagram illustrating the immersion enhancement processing unit 105 of FIG. 1.

Referring to FIG. 3, the immersion enhancement processing unit 105 includes an image processing factor determination unit 301 and an image processing unit 302. As described above, the immersion enhancement processing unit 105 may process immersion enhancement of the input image by determining whether the immersion enhancement is necessary based on the predicted immersion enhancement degree. The immersion enhancement processing unit 105 processes the immersion enhancement for the input image in which the predicted immersion enhancement degree is greater than a predetermined threshold of the immersion enhancement degree.

The image processing factor determination unit 301 may determine an image processing factor for the immersion enhancement. The image processing factor determination unit 301 may determine the image processing factor using an IEI with respect to the image processing factor. The image processing unit 302 may process the immersion enhancement for the input image corresponding to the determined image processing factor.

When the image processing factor is a color information difference, the image processing unit 302 processes a brightness and a saturation of the input image, and when the image processing factor is an image information difference, the image processing unit 302 processes detail enhancement and a soft blur for the input image. The image processing factor determination unit 301 is described in detail with reference to FIG. 4.

Figure 4:
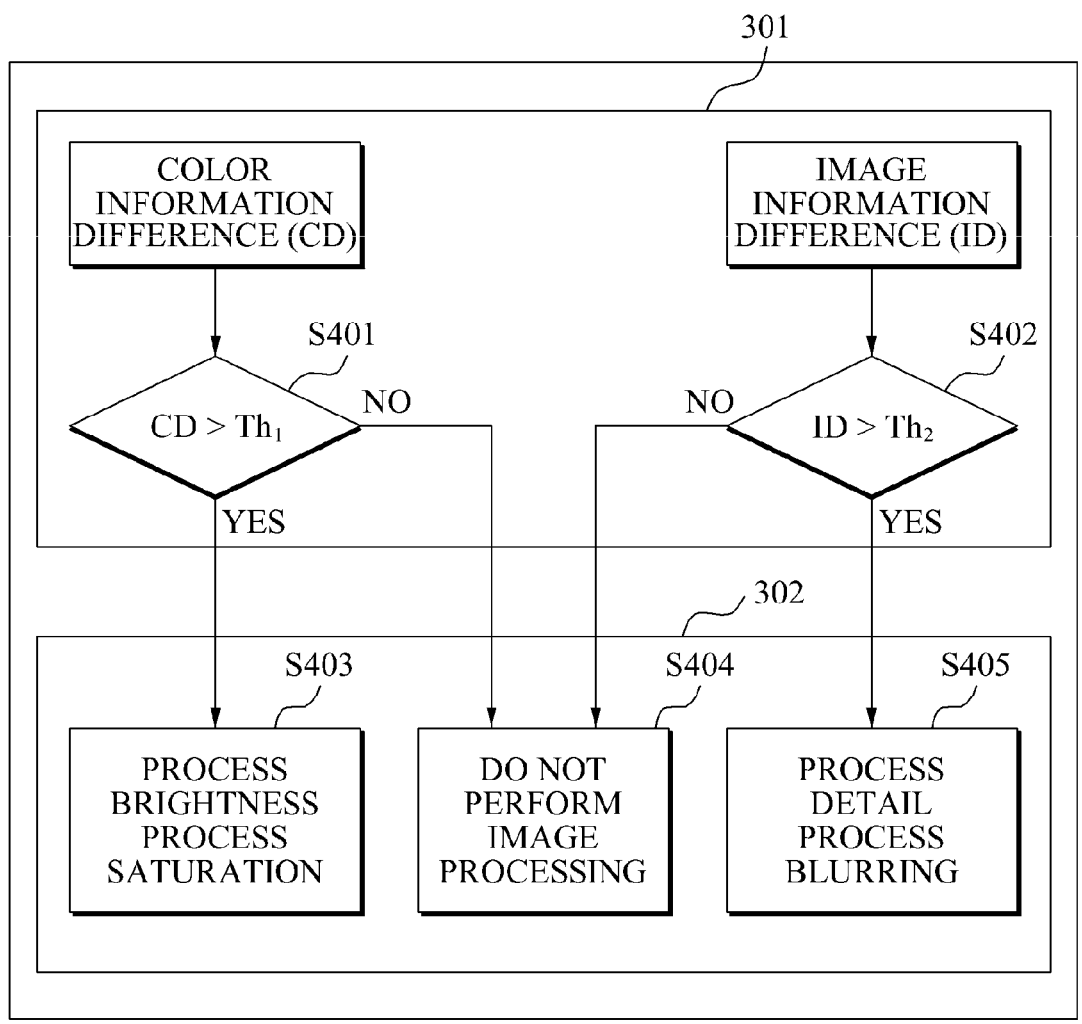
FIG. 4 illustrates a specific operation performed by an image processing factor determination unit and an image processing unit of FIG. 3.

FIG. 4 illustrates a specific operation performed by the image processing factor determination unit 301 and the image processing unit 302 of FIG. 3.

The image processing factor determination unit 301 may determine an image processing factor for the immersion enhancement. Referring to FIG. 4, in operation S401 and operation S402, the image processing factor determination unit 301 may compare an immersion enhancement degree with respect to a color information difference (CD) and an immersion enhancement degree with respect to an image information difference (ID), and predetermined thresholds $Th_1$ and $Th_2$, and may determine the image processing factor.

For example, the immersion enhancement degree with respect to the CD and the immersion enhancement degree with respect to the ID may be determined by Equation 12:

$$CD_{IEI\_P} = \frac{CD_{IEI}}{CD_{IMI}} \times 100\%$$ [Equation 12]

$$ID_{IEI\_P} = \frac{ID_{IEI}}{ID_{IMI}} \times 100\%,$$

where $CD_{IEI\_P}$ and $ID_{IEI\_P}$ respectively denote an immersion enhancement degree with respect to a CD and an immersion enhancement degree with respect to an ID. Other variables are detailed in the above-described Equation 6, the above-described Equation 7, and the above-described Equation 9.

The predetermined thresholds $Th_1$ and $Th_2$ may be set as 50%. Accordingly, the image processing factor with respect to the immersion enhancement degree in which any one of the immersion enhancement degree with respect to the CD and the immersion enhancement degree with respect to the ID is greater than the predetermined threshold may be determined. In operation S404, when the image processing factor is less than or equal to the predetermined threshold with respect to the immersion enhancement degree, image processing is not performed.

The image processing unit 302 may process the immersion enhancement for the input image corresponding to the determined image processing factor. In operation S403, when the determined image processing factor is the CD, the image processing unit 302 processes a brightness and a saturation of the input image. In operation S405, when the determined image processing factor is the ID, the image processing unit 302 processes detail and blurring for the input image.

A process during which the image processing unit 302 processes the brightness and the saturation is not limited to a specific method, and various methods may be applied. A process during which the image processing unit 302 processes the detail and the blurring is not limited to a specific method, and various methods may be applied.

FIG. 5 illustrates an example of predicting an immersion enhancement degree of an input image according to an embodiment of the present invention. Referring to FIG. 5, a test image denotes an input image.

FIG. 5 is the example of determining immersion enhancement degree of an input image by applying the above-described Equations 4 through 12. A constant is variously applied in each Equation. CD denotes a color information difference, IDE denotes an energy difference, IDC denotes a color distribution difference, SIZE denotes a viewing angle, and FAR denotes a foreground ratio. IMI denotes an Image Immersion Index, and IEI denotes an Immersion Enhancement Index. A percentage of CD and a percentage of IDE may be determined by the above-described Equation 12. SUM with respect to IMI may be determined by the above-described Equation 8, and SUM with respect to IEI may be determined by the above-described Equation 9.

Accordingly, referring to FIG. 5, the immersion enhancement degree denotes (18.62/50.00)*100%=37.08%. When a predetermined threshold of the immersion enhancement degree is 30%, the immersion enhancement processing unit 105 processes immersion enhancement of the input image. Conversely, when the predetermined threshold of the immersion enhancement degree is 40%, the immersion enhancement processing unit 105 does not process the immersion enhancement of the input image.

Figure 6:
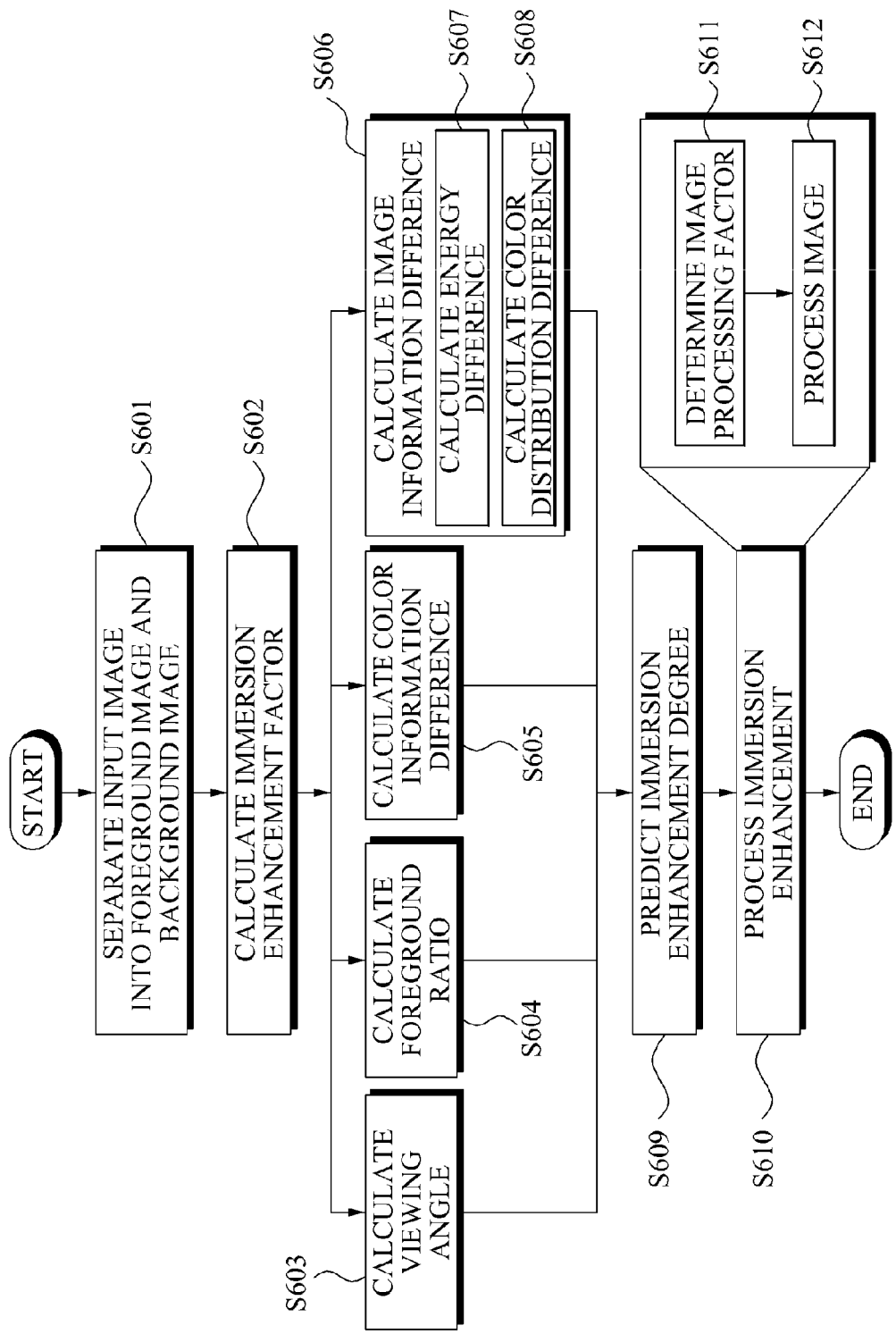
FIG. 6 is a flowchart illustrating a method of enhancing an immersion according to an embodiment of the present invention.

FIG. 6 is a flowchart illustrating a method of enhancing an immersion according to an embodiment of the present invention.

In operation S601, the method of enhancing the immersion according to aspects of the present invention separates an input image into a foreground image and a background image using color information and frequency information of the input image.

In operation S602, the method of enhancing the immersion according to aspects of the present invention calculates an immersion enhancement factor of the input image using the separated foreground image and the separated background image.

In operation S603, the method of enhancing the immersion according to aspects of the present invention calculates a viewing angle using a total size of the input image.

In operation S604, the method of enhancing the immersion according to aspects of the present invention calculates a foreground ratio to the entire input image.

In operation S605, the method of enhancing the immersion according to aspects of the present invention calculates a color information difference between the foreground image and the background image of the input image.

The calculating of the color information difference in operation S605 calculates a difference of a brightness, a saturation, and a hue between the foreground image and the background image of the input image.

In operation S606, the method of enhancing the immersion according to aspects of the present invention calculates an image information difference between the foreground image and the background image of the input image.

The calculating of the image information difference in operation S606 includes calculating an energy difference between the foreground image and the background image of the input image in operation S607, and calculating a color distribution difference between the foreground image and the background image of the input image in operation S608.

The calculating of the energy difference in operation S607 calculates an image gradient ratio between the foreground image and the background image of the input image using brightness information.

The calculating of the color distribution difference in operation S608 calculates the color distribution difference between the foreground image and the background image of the input image using saturation information and hue information.

In operation S609, the method of enhancing the immersion according to aspects of the present invention predicts an immersion enhancement degree of the input image using the immersion enhancement factor.

The predicting in operation S609 predicts the immersion enhancement degree of the input image using an IMI and an IEI of each immersion enhancement factor.

In operation S610, the method of enhancing the immersion according to aspects of the present invention processes immersion enhancement of the input image by determining whether the immersion enhancement is necessary based on the predicted immersion enhancement degree.

The processing in operation S610 processes the immersion enhancement for the input image in which the predicted immersion enhancement degree is greater than a predetermined threshold of the immersion enhancement degree.

The processing in operation S610 includes determining an image processing factor for the immersion enhancement in operation S611, and processing the immersion enhancement for the input image corresponding to the determined image processing factor in operation S612.

The method of enhancing the immersion according to aspects of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described aspects of the present invention.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A system for enhancing an immersion, the system comprising:
    a foreground/background separation unit to separate an input image into a foreground image and a background image using color information and frequency information of the input image;
    an immersion enhancement factor calculation unit to calculate an immersion enhancement factor of the input image using the foreground image and the background image;
    an immersion enhancement prediction unit to predict an immersion enhancement degree of the input image using the immersion enhancement factor; and
    an immersion enhancement processing unit to process immersion enhancement of the input image by determining whether the immersion enhancement is necessary based on the predicted immersion enhancement degree.

2. The system of claim 1, wherein the immersion enhancement factor calculation unit comprises:
    a viewing angle calculation unit to calculate a viewing angle using a total size of the input image;
    a foreground ratio calculation unit to calculate a foreground ratio to the entire input image;
    a color information difference calculation unit to calculate a color information difference between the foreground image and the background image of the input image; and
    an image information difference calculation unit to calculate an image information difference between the foreground image and the background image of the input image.

3. The system of claim 2, wherein the foreground ratio calculation unit calculates the foreground ratio using a number of pixels included in the foreground image.

4. The system of claim 2, wherein the color information difference calculation unit calculates a difference of a brightness, a saturation, and a hue between the foreground image and the background image of the input image.

5. The system of claim 2, wherein the image information difference calculation unit comprises:
an energy difference calculation unit to calculate an energy difference between the foreground image and the background image of the input image; and
a color distribution difference calculation unit to calculate a color distribution difference between the foreground image and the background image of the input image.

6. The system of claim 5, wherein the energy difference calculation unit calculates an image gradient ratio between the foreground image and the background image of the input image using brightness information.

7. The system of claim 5, wherein the color distribution difference calculation unit calculates the color distribution difference between the foreground image and the background image of the input image using saturation information and hue information.

8. The system of claim 1, wherein the immersion enhancement prediction unit predicts the immersion enhancement degree of the input image using an Image Immersion Index (IMI) and an Immersion Enhancement Index (IEI) of each immersion enhancement factor.

9. The system of claim 1, wherein the immersion enhancement processing unit processes the immersion enhancement for the input image in which the predicted immersion enhancement degree is greater than a predetermined threshold of the immersion enhancement degree.

10. The system of claim 9, wherein the immersion enhancement processing unit comprises:
an image processing factor determination unit to determine an image processing factor for the immersion enhancement; and
an image processing unit to process the immersion enhancement for the input image corresponding to the determined image processing factor.

11. The system of claim 10, wherein, when the image processing factor is a color information difference, the image processing unit processes a brightness and a saturation of the input image, and
when the image processing factor is an image information difference, the image processing unit processes detail enhancement and a soft blur for the input image.

12. A method of enhancing an immersion, the method comprising:
separating an input image into a foreground image and a background image using color information and frequency information of the input image;
calculating an immersion enhancement factor of the input image using the separated foreground image and the separated background image;
predicting an immersion enhancement degree of the input image using the immersion enhancement factor; and
processing immersion enhancement of the input image by determining whether the immersion enhancement is necessary based on the predicted immersion enhancement degree.

13. The method of claim 12, wherein the calculating comprises:
calculating a viewing angle using a total size of the input image;
calculating a foreground ratio to the entire input image;
calculating a color information difference between the foreground image and the background image of the input image; and
calculating an image information difference between the foreground image and the background image of the input image.

14. The method of claim 13, wherein the calculating of the color information difference calculates a difference of a brightness, a saturation, and a hue between the foreground image and the background image of the input image.

15. The method of claim 13, wherein the calculating of the image information difference comprises:
calculating an energy difference between the foreground image and the background image of the input image; and
calculating a color distribution difference between the foreground image and the background image of the input image.

16. The method of claim 15, wherein the calculating of the energy difference calculates an image gradient ratio between the foreground image and the background image of the input image using brightness information.

17. The method of claim 15, wherein the calculating of the color distribution difference calculates the color distribution difference between the foreground image and the background image of the input image using saturation information and hue information.

18. The method of claim 12, wherein the predicting predicts the immersion enhancement degree of the input image using an IMI and an IEI of each immersion enhancement factor.

19. The method of claim 12, wherein the processing processes the immersion enhancement for the input image in which the predicted immersion enhancement degree is greater than a predetermined threshold of the immersion enhancement degree.

20. The method of claim 19, wherein the processing comprises:
determining an image processing factor for the immersion enhancement; and
processing the immersion enhancement for the input image corresponding to the determined image processing factor.

* * * * *